United States Patent

[11] 3,563,379

| [72] | Inventors | Virgil Melvin Stapf<br>St. Louis;<br>James R. Gender, Kirkwood, Mo. |
|---|---|---|
| [21] | Appl. No. | 774,689 |
| [22] | Filed | Nov. 12, 1968 |
| [45] | Patented | Feb. 16, 1971 |
| [73] | Assignee | Barry-Wehmiller Company<br>St. Louis, Mo.<br>a corporation of Missouri |

[54] CONTAINER FILL LEVEL INSPECTION APPARATUS
4 Claims, 5 Drawing Figs.

[52] U.S. Cl. ................................................ 209/111.7, 356/240
[51] Int. Cl. .................................................. B07c 5/342
[50] Field of Search .......................................... 356/134, 240, 197; 250/223B; 209/111.7, 82

[56] References Cited
UNITED STATES PATENTS

| 3,094,213 | 6/1963 | Wyman .......................... | 209/111.7 |
| 3,094,214 | 6/1963 | Wyman et al. ................. | 209/111.7 |
| 3,133,638 | 5/1964 | Calhoun ......................... | 209/111.7X |
| 3,454,759 | 7/1969 | Calhoun ......................... | 250/223B |

FOREIGN PATENTS

| 955,037 | 4/1964 | Great Britain. | |

Primary Examiner—Allen N. Knowles
Attorney—Gravely, Lieder and Woodruff

ABSTRACT: Apparatus for inspecting a moving series of containers to detect improperly filled and empty containers and reacting to reject the same from those properly filled, and including an inspecting head assembly containing the components which perform the inspecting as rapidly as containers are moved through an inspection station without necessitating stop and start sequencing.

Patented Feb. 16, 1971

INVENTORS:
VIRGIL MELVIN STAPF
JAMES R. GENDER
BY
Gravely, Lieder & Woodruff
ATTORNEYS.

Patented Feb. 16, 1971

FILLER CONTAINER

UNDERFILLED CONTAINER

INVENTORS.
VIRGIL MELVIN STAPF
JAMES R. GENDER
BY Gravely Lieder & Woodruff
ATTORNEYS.

CONTAINER FILL LEVEL INSPECTION APPARATUS

This invention relates to apparatus for inspecting transparent containers to determine the extent of filling in relation to a predetermined desired fill level, and to certain improvements in such apparatus.

The problem in inspecting transparent containers is that the construction of containers varies widely and that there is lack of uniformity of color. Also, the speed at which inspecting must be accomplished has a significant effect on the type of components capable of reading a moving line of containers for level of fill, and there is a problem of obtaining a simple combination of components.

In addition there is the problem of determining if transparent containers are filled to a predetermined minimum level while the containers are in motion at speeds which permit each container to be within the detection zone for only an extremely short time. In addition to the time factor, the detection must determine if containers are properly filled, regardless of whether the container and/or contents are clear or colored, and whether there is foam present above the contents. Also, allowance must be made for increase of contents level resulting from the subsequent dispersion of the foam. Thus, the problem is related to the sensitivity of the apparatus components used and to the lens effect of the convex shape of the containers.

The objects of this invention are to provide inspection means for determining fill level in containers while the containers are moving in a conveyor system, to provide fill level inspection apparatus of simple construction that can be adjusted to read a desired level of fill for a range of container sizes, to provide an assembly of components capable of easy servicing with subassembly units to simplify the field servicing for customers, to provide an improved combination of optical and electronic components in an inspection head having features considered to be unique, and in other components and combinations of components to be described hereinafter.

The objects of this invention are carried out with a preferred apparatus that continually moves containers through an inspection station, and has a unique arrangement for viewing the condition of fill of each container through the projection of light upon each container and an optically sensitive receiver which converts the optical reading into electrical pulses that can be usefully applied to rejecting means for removing those containers that are not properly filled. In practice the apparatus incorporates a light energy responsive means to produce a voltage output that is representative of the fill condition in a container and applies a predetermined change in voltage to a circuit in which reject means is embodied.

This invention as applied in practice also includes the combination of means for inspecting for a particular level of fill of liquid in containers which have the characteristics of refracting radiant energy projected thereon substantially at the particular level of fill and not refracting the radiant energy when the liquid is not at that level of fill, means for scanning the refracted and unrefracted radiant energy to distinguish one from the other, and electrically responsive means to produce appropriate signals for rejecting the containers that do not refract the radiant energy in the manner when liquid is present.

The invention above broadly summarized may be practiced by apparatus now to be described in detail, with reference being directed to the accompanying drawings, wherein.

Figures 1, 2:
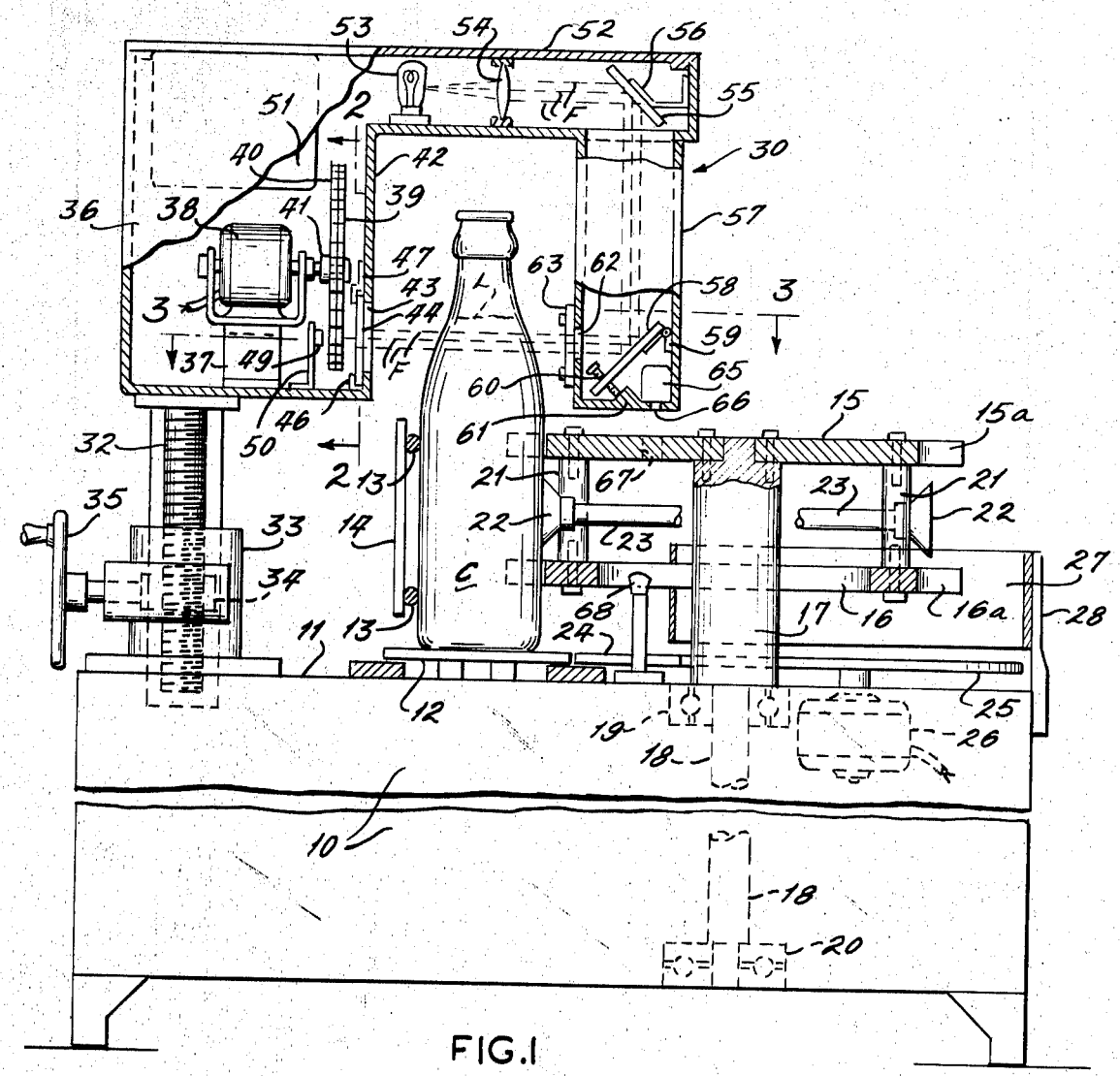
FIG. 1 is a fragmentary sectional elevational view of a presently preferred embodiment of apparatus, as seen from the side looking in the direction in which the containers are moved away from the observer.
FIG. 2 is a greatly enlarged detailed view of the rotating mask, adjustable light shutters and the video light energy sensitive cell, the view being taken at line 2—2 in FIG. 1.

With particular reference to FIG. 1, the present apparatus is operatively mounted on a base 10 having an upper surface 11 over which a suitable flat plate conveyor 12 is adapted to move. In the inspection zone the containers C are guided by suitable guide bars 13 supported at space intervals by vertical members 14. A pair of star wheels 15 and 16 are rotatably mounted on an enlarged hub 17 carried by a shaft 18 in bearings 19 and 20 in the base 10. The star wheel 15 is a disc having peripheral recesses 15a to engage and mesh with the successive containers C. The star wheel 16 is an annular ring also having peripheral recesses 16a likewise to mesh with the containers. The star wheel 16 is connected to the star wheel 15 by a plurality of rods 21 which space the star wheel so that a plurality of suction cups 22, each mounted on suction tubes 23, may be positioned between the star wheels. The tubes 23 are connected into a valved suction system (not shown) which is fully described in the Drennan U.S. Pat. No. 2,800,226, issued July 23, 1957. The action of the suction cups 22 is to hold a container to be rejected in the recesses 15a and 16a until it is moved over a dead plate 24 and onto a rotary reject table 25 driven by suitable motor means 26. The rejected containers are collected on the table 25 by a curved fence 27 secured to a plurality of brackets 28 (one being shown).

The apparatus described above is in certain respects more particularly shown in the Wyman U.S. Pat. No. 3,160,277, issued Dec. 8, 1964, except for the guide bars 13 herein shown for simplicity of disclosure.

The base 10 supports an inspection head 30 which is mounted on a crosshead 31 having a pair (one being seen) of slide guides vertically movable into and out of the base. A vertical screw shaft 32 fixed to the crosshead 31 extends through a gear stand 33 in which a worm gear and nut unit 34 is mounted. The gear is rotated in reverse directions by a hand wheel 35 to raise or lower the head 30 to suit the size of container C being inspected for its condition of fill.

The inspection head 30 has a main housing section 36 which supports a stand 37 for an electric motor 38 driving a rotary mask consisting of a pair of discs 39 and 40 mounted on a friction hub 41. The discs provide a plurality of peripheral recesses R which in the view of FIG. 2 coincide. However, by relatively rotating the discs the effective width of the recesses R may be reduced. The adjacent wall 42 of the housing section 36 has a window opening 43, and the window opening is more or less opened by a pair of shutter plates 44 and 45 mounted in horizontal guide brackets 46 and 47. As can be seen in FIG. 2, the plate 45 is horizontally adjustable by an adjustment thumb nut 48, and can be moved toward or away from the fixed plate 44 to decrease or increase the horizontal width of the effective window opening.

The head section also carries a light energy sensitive cell, such as a video cell 49, the cell being mounted on a bracket 50 behind the path of rotation of the mask discs 39 and 40. In addition, the electronic components, later to be noted, are carried in a box 51 in the space above the motor 38, whereby a compact assembly can be achieved.

The inspection head 30 includes a horizontal housing section 52 which extends over the container inspection station. A light energy source, such as lamp 53 is carried in this housing section, and a collimating lens 54 directs the light beam upon a mirror 55 mounted at approximately 45° by a bracket 56. Thus, the light rays F emanating from the lamp are directed in parallel paths to the mirror 55 and are turned downwardly into a depending housing section 57. Near the bottom of the depending housing 57 an adjustable mirror 58 is attached to a hinge bracket 59. The bracket includes a suitable spring (not shown) to always hold the mirror adjusting screw 60 upon an abutment 61. A window opening 62 adjacent the inner wall of the housing section 57 is covered by a removable glass panel 63 so the adjusting screw 60 can be reached to set the angular position of the mirror 58 to swing the light ray F up or down as desired in relation to the zone of the fill level L in the container. Once this adjustment has been made for a given size of container it is not readjusted, as thereafter the entire head 30 may be moved vertically to take in different size containers and different conditions of fill levels, with and without foam characteristics.

Figure 3:
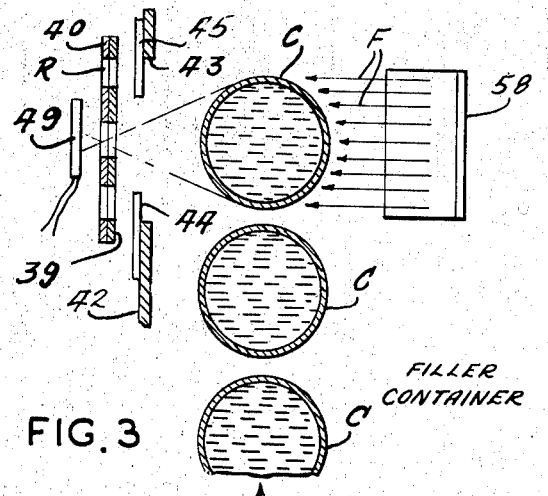
FIG. 3 is a fragmentary plan view of the inspection station taken at line 3—3 in FIG. 1 showing the lens effect of the contents of a filled container.
Figure 3A:
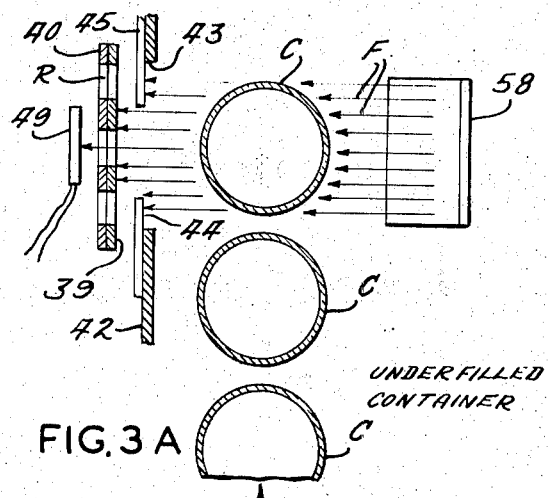
FIG. 3A is a view similar to FIG. 3, but illustrating the path of the light energy when an underfilled container is being inspected.

Turning now to FIGS. 3 and 3A it can be seen that the collimated light ray F is directed horizontally or in a predetermined path by the mirror 58 toward the containers C as a succession thereof moves in the direction of the arrow through the inspection station provided by head 30. The light emerges from the container in a refracted or an unrefracted condition and passes toward the rotating mask where it passes through the recesses R therein and falls upon the light sensitive means 49. When, as in FIG. 3, a filled container is in the inspection station, the liquid contents causes the light rays to be refracted and converge on a vertical axis at approximately the plane of the recesses R. As the recesses R scan past the light sensitive means 49, they cause the light to be modulated in intensity. The means 49 produces a modulated electrical signal in response to the modulated light. When, on the other hand, an underfilled or empty container is in the inspection station, the light rays remain essentially unrefracted and undisturbed (FIG. 3A) as they pass through. In this condition the light has substantially uniform intensity throughout its cross section. As the recesses R scan across this uniform light they permit a constant amount of light to reach the sensitive means 49, and the latter produces an unmodulated electrical signal. In each case the window 62 prior to the container C is sized to limit the height and width to the desired dimensions.

The light, passing from a container, enters the gap between the shutter plates 44 and 45 and through the moving recesses R before reaching the sensitive means 49. In a preferred arrangement, the rotary mask was formed with 20 recesses so that the rotation of 3,000 r.p.m. produced 1,000 recesses per second passing the sensitive means 49. Since the recess width is a minor portion of the light beam width, a scanning of the light beam cross section is produced. The plates 44 and 45 are preferably spaced apart such that as a recess R begins to emerge from behind plate 45, the preceding recess R is beginning to submerge behind plate 44. The number of recesses R exposed to the light rays F is thus continuously limited to one whole recess, and the sensitive means 49 receives a constant amount of light when the beam cross section is uniform in the area between the plates 44 and 45.

It should now be apparent when an underfilled or empty container C is in the inspection station (FIG. 3A), the collimated light rays F remain essentially unrefracted or undisturbed. The light reaching the recesses R is thus uniform in cross section in the scanning area and the sensitive means 49 receives a constant amount of light and produces an electrical signal of substantially constant amplitude.

When a filled container is in the inspection station FIG. 3, the collimated light rays F are refracted and caused to converge on a vertical axis by the lens effect of the contents. The beam width at the axis of convergence is narrowed to the width of one of the mask recesses R and the recess R is located to intercept the light beam at the axis of convergence. Since the convergent beam is narrowed at this location, the disc recesses R are not within the light beam when they first emerge from behind plate 45. As a recess R traverses the distance between the spaced edges of plates 44 and 45, it passes first through the darkened area, then through the convergence axis where the intensified light is present, and then through a second darkened area before submerging behind plate 44. The light reaching means 49 is thus modulated and the means 49 produces a modulated electrical signal in response.

Figure 4:
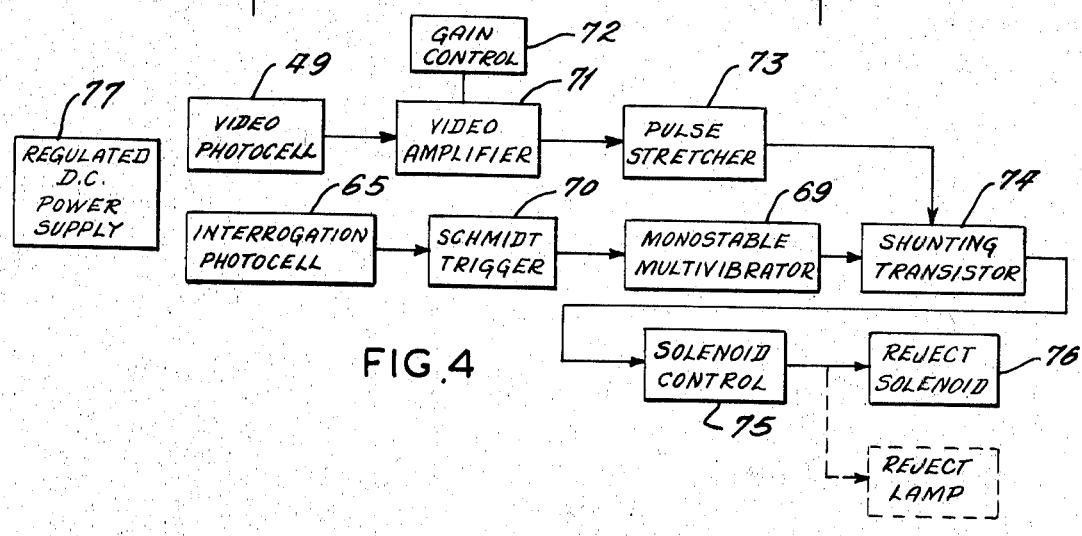
FIG. 4 is a schematic block diagram of the electrical circuit for the apparatus of FIG. 1.

The detection and rejection circuit for the foregoing apparatus is shown in block diagram in FIG. 4. The functional parts of the circuit are as follows:

The circuit includes an interrogation photocell 65 (FIG. 1) mounted in the depending head section 57 over an aperture 66. The star wheel 15 rotating beneath the aperture 66 is formed with a series of slots 67, one for each container recess 15a, and a light source 68 directed upwardly from the base 10 is aimed at the path of these slots 67 so that each time a container is approximately at the inspection station, the cell 65 is activated and, in turn, activates a monostable multivibrator 69 through a Schmidt trigger device 70 (FIG. 4).

The circuit assembly in the box 51 in the head 30 includes a video amplifier 71 which is a two-stage, capacitor-coupled, transistor amplifier which amplifies the electrical signals produced by the light sensitive means 49. A gain control potentiometer 72 permits the output signal to be adjusted to the desired magnitude. This signal passes to a pulse stretcher 73 where by means of a diode-storage capacitor arrangement the signal pulses are stretched until they form a continuous output signal. A shunting transistor 74 receives inputs from both the pulse stretcher 73 and the monostable multivibrator 69. The pulse stretcher input causes the shunting transistor 74 to conduct and thereby shunt to ground the input from the monostable multivibrator 69. With no input present from the pulse stretcher 73, the shunting transistor 74 is in a nonconducting state and the input from the monostable multivibrator instead of being shunted to ground is permitted to pass to a solenoid control 75.

The solenoid control 75 is operated by the reject signal from the shunting transistor 74, and when the reject signal is received it turns on a triac semiconductor and also activates a capacitor discharge timing circuit. The timing circuit keeps the triac activated for a period of approximately 90 milliseconds. The triac serves as a switch to control 115 volt AC power to the reject solenoid 76.

The power supply 77 furnishes plus 15 volts DC power to the electronic circuits, and receives power from a stepdown transformer on the AC power line (not shown). The low-voltage AC power is rectified by a silicon bridge rectifier, filtered, and then regulated by a Zener diode regulator.

In operation, if a container C is under filled, no signals are generated by means 49, the shunting transistor 74 does not conduct, and the pulse from the monostable multivibrator 69 causes the solenoid control 75 to energize the reject solenoid 76 and that container is held by the suction cup 22 until it reaches the table 25 (FIG. 1). If the container is properly filled, the means 49 produces signals which after amplification and stretching, causes the shunting transistor 74 to conduct. The pulse from the monostable multivibrator is shunted to ground by the shunting transistor and the solenoid control 75 remains deactivated so that that container continues on with the conveyor 10 past the inspection station.

In a successful test arrangement, the monostable multivibrator pulse was such that its time duration was equal to several stretched pulses from the video amplifier and pulse stretcher.

It should now be fully apparent in what manner the present apparatus operates, and changes and modifications that may come to mind are intended to be included within the scope of the appended claims.

We claim:

1. Apparatus for inspecting transparent containers for fill level of the contents comprising: a source of light energy projected along a predetermined path; light energy sensitive means spaced from said source and disposed in the predetermined path; means forming a window opening in front of said sensitive means; means to adjust the size of said window opening; scanner means movable across said window opening and in front of said sensitive means, said scanner means having spaced recesses adapted selectively to successively and continuously pass the projected light energy in the predetermined path; means to vary the size of said scanner recesses whereby the number of whole recesses passing said window opening is continuously limited to one whole recess; containers movable across the predetermined path of light energy for inspection of a normal fill level of the contents, the contents when at a predetermined level in a container causing said light energy in the predetermined path to converge on a vertical axis substantially in the plane of movement of said scanner means and when at less than the predetermined level causes substantially no convergence of the light energy relative to said scanner means, said light sensitive means reacting to the convergent light energy and said scanner means to produce a modulated electrical signal indicative of the fill level and reacting to the nonconvergent light energy and said scanner means to produce an unmodulated electrical signal indicative of the less than normal fill level.

2. Apparatus for inspecting transparent containers for a predetermined normal level of fill comprising: a housing having spaced sections formed with aligned openings; a source of light in said housing; means in one housing section projecting a beam from said light source through said aligned windows across the space between said sections; light-responsive electrically sensitive receiver means in the other housing section adjacent said opening therein to receive the light beam; light scanner means in the other housing section adjacent said receiver means, said scanner means having a series of spaced recesses sequentially movable in front of said receiver means at a substantially uniform rate to permit a substantially constant amount of light from the light beam to impinge thereon to produce an unmodulated electrical signal; and filled containers movable through the space between said housing sections, the extent of fill being at an elevation within the containers such that the predetermined normal level of fill intercepts the light beam passing between said openings and refracts the light to concentrate the energy of the refracted light and cause it to impinge on said sensitive means to produce a modulated electrical signal, containers not filled to the predetermined level passing without refracting the substantially constant amount of light.

3. A container fill level inspecting apparatus to be used in connection with continuously moving transparent containers comprising in combination: light sensitive photocell means positioned adjacent one side of a line of container movement; light-beam projecting means positioned at the other side of the line of container movement and directing the light beam at said sensitive means; an electrical detection circuit connected to said sensitive means and providing for a conductive circuit responsive to containers of a desired fill level and a nonconductive circuit response for containers of less than the desired fill level; light scanning means operably mounted adjacent said sensitive means and permitting a substantially constant amount of light to reach said sensitive means for underfilled containers, said light scanning means comprises rotary means having peripheral recesses movable in front of said photocell means, and shutter means adjustable to limit the exposure of said light sensitive photocell means constantly to one whole recess, filled containers refracting the light beam to concentrate the light reaching said sensitive means to provide said conductive circuit response; and container rejection means responsive to said nonconductive circuit response for rejecting containers having less than the desired fill level.

4. A radiant energy device adapted to straddle a traveling conveyor for continuously inspecting transparent containers for a desired fill level, comprising: first means to generate and project a radiant energy beam across the line of travel through each of the containers and at the desired fill level elevation, properly filled containers acting as a convergent lens to concentrate the energy of the projected beam and improperly filled containers leaving the projected beam undisturbed; second means to receive the projected beam and produce an electrical signal related to the amount of energy received; third means adjacent said second means to scan the projected beam for the undisturbed and concentrated energy of the projected beam; other means adjacent the path of the projected beam to select an effective dimension thereof, and said third means including movable means having a series of beam scanning surfaces spaced apart to a dimension substantially equal to the dimension selected for said other means.